United States Patent [19]

Fischer et al.

[11] 4,256,353
[45] Mar. 17, 1981

[54] SELF-ALIGNING BEARING

[75] Inventors: George A. Fischer; Melvin A. Prohl, both of Boxford, Mass.

[73] Assignee: General Electric Company, Lynn, Mass.

[21] Appl. No.: 40,163

[22] Filed: May 18, 1979

[51] Int. Cl.³ .................... F16C 23/04; F16C 27/02; F16C 35/02
[52] U.S. Cl. .................................. 308/26; 308/72; 308/135
[58] Field of Search .................. 308/15, 22, 26, 28, 308/29, 72, 135, 140, 143, 145, 184 A, DIG. 4

[56] References Cited

U.S. PATENT DOCUMENTS

| 2,524,693 | 10/1950 | Bryant | 308/26 |
|---|---|---|---|
| 2,735,731 | 2/1956 | Freebairn, Jr. et al. | 308/2 |
| 2,751,262 | 6/1956 | Federn et al. | 308/26 |
| 2,869,936 | 1/1959 | Federn | 308/15 |
| 3,048,452 | 8/1962 | Addie | 308/26 |
| 3,290,949 | 12/1966 | Samet | 74/5 |
| 3,746,409 | 7/1973 | Heiland | 308/15 |
| 4,134,309 | 1/1979 | Balke et al. | 308/26 |
| 4,170,388 | 10/1979 | Naegeli | 308/15 |

FOREIGN PATENT DOCUMENTS

| 375959 | 3/1964 | Switzerland | 308/15 |
|---|---|---|---|
| 779426 | 7/1957 | United Kingdom | 308/26 |

Primary Examiner—Richard R. Stearns
Attorney, Agent, or Firm—James W. Mitchell

[57] ABSTRACT

In large turbine machines, it is critical to bearing performance that the turbine rotor remain aligned with the bearing surfaces. Misalignment can occur due to high thrust loads or thermal deformation. The object of the invention is to ensure correct rotor-bearing alignment under all operating conditions. The invention is a self-aligning bearing support structure capable of accommodating angular rotor misalignments. The bearing support structure includes a bearing casing which transfers axial loads or thrusts to the bearing standard through a yoke attached to the bearing casing and to the bearing standard by pairs of axially oriented flex struts. In combination with the axially oriented flex struts a transverse flex plate supports the bearing vertical load.

9 Claims, 4 Drawing Figures

SELF-ALIGNING BEARING

BACKGROUND OF THE INVENTION

This invention relates to bearing supports for large, rotating shaft, turbomachines; and, in particular, is related to a self-aligning journal-thrust bearing and bearing support.

Many kinds of machines have rotating shafts or rotors which can develop large axial thrust forces. Typically, a collar or runner on the shaft transmits the thrust load to a stationary thrust bearing. One common type of thrust bearing is a tapered land thrust bearing. The bearing face is divided into several lands separated by radial oil supply grooves. These grooves have dams at their outer ends and are supplied with oil under pressure to give controlled and positive oil feed to the inlet edges of the lands. Each land is made with a fixed sloping bearing surface creating the hydrodynamic oil film wedge necessary to produce high thrust load carrying capability during operation. It is known that tapered land thrust bearings can withstand very high loads when properly aligned. A small flat area at the trailing edge of each land is made parallel to the thrust runner to carry thrust loads when starting or at low turning speeds.

In a steam turbine, many thrust bearing failures are related to misalignment, often aggravated by high thrust loads due to water induction. Misalignment can occur when high thrust loads cause deformation and tilting of the stationary bearing pedestal or if the bearings supporting the rotor move radially relative to each other due to differential thermal expansion in the pedestals and foundations. It is therefore desirable to incorporate a self-aligning capability into a bearing structure to allow the stationary thrust bearing to conform to the orientation of the rotating thrust runner under operating conditions. Equal or nearly equal loading on the various lands of the thrust bearing is thereby maintained at all times.

It is one object of the present invention to provide a bearing support structure capable of accommodating angular rotor misalignments.

It is another object of the invention to provide a bearing support structure which is very stiff in the axial and radial directions and reasonably flexible in a tilting mode to accommodate angular misalignment in the rotor.

The novel features believed characteristic of the present invention are set forth in the appended claims. The invention itself, however, together with further objects and advantages thereof, may best be understood with reference to the following description taken in connection with the included drawings.

BRIEF DESCRIPTION OF THE INVENTION

One application of the present invention to a large rotating shaft turbine machine occurs in a steam turbine. The turbine rotating shaft or rotor is formed with an enlarged thrust collar or wheel-like portion perpendicular to the axis of rotation which is called a thrust runner. The present invention is applied to a thrust-journal bearing wherein axial movement or a resultant thrust in either axial direction of the rotor is transmitted to the thrust bearing. It is desirable and critical to ensure that the thrust runner surface be parallel to the thrust bearing face; i.e., the thrust runner surface must be in alignment with the thrust bearing face.

The present invention is comprised of a bearing casing or bearing housing, an annular ring or yoke, axial strut members which act in pairs and a vertical flex plate. A first pair of axial strut members connect the bearing casing to the yoke. A second pair of axial strut members connect the yoke to the bearing standard end wall. The transverse flex plate is fixed to the floor of the bearing standard and is connected at its free end to the bearing casing. The axial strut members may have rectangular cross-sections at their flexible portion. The first pair of axial struts is oriented so that the mid-plane of the flexible portion lies in a vertical plane through the centerline of the rotor. The first pair of axial struts accommodates sideways angular misalignment. The second pair of axial struts is oriented so that the mid-plane of the flexible portion lies in a horizontal plane through the centerline of the rotor axis to accommodate angular misalignment in the vertical plane. The transverse flex plate can twist and/or bend to accommodate any angular misalignment.

The bearing casing or housing is thus permitted to tilt vertically or horizontally which allows the bearing casing to follow, to a limited extent, rotor angular misalignment in the horizontal or vertical plane. Hence, the bearing self-aligns with the rotor to thus satisfy the object of the invention.

DETAILED DESCRIPTION OF THE INVENTION

Figure 1:
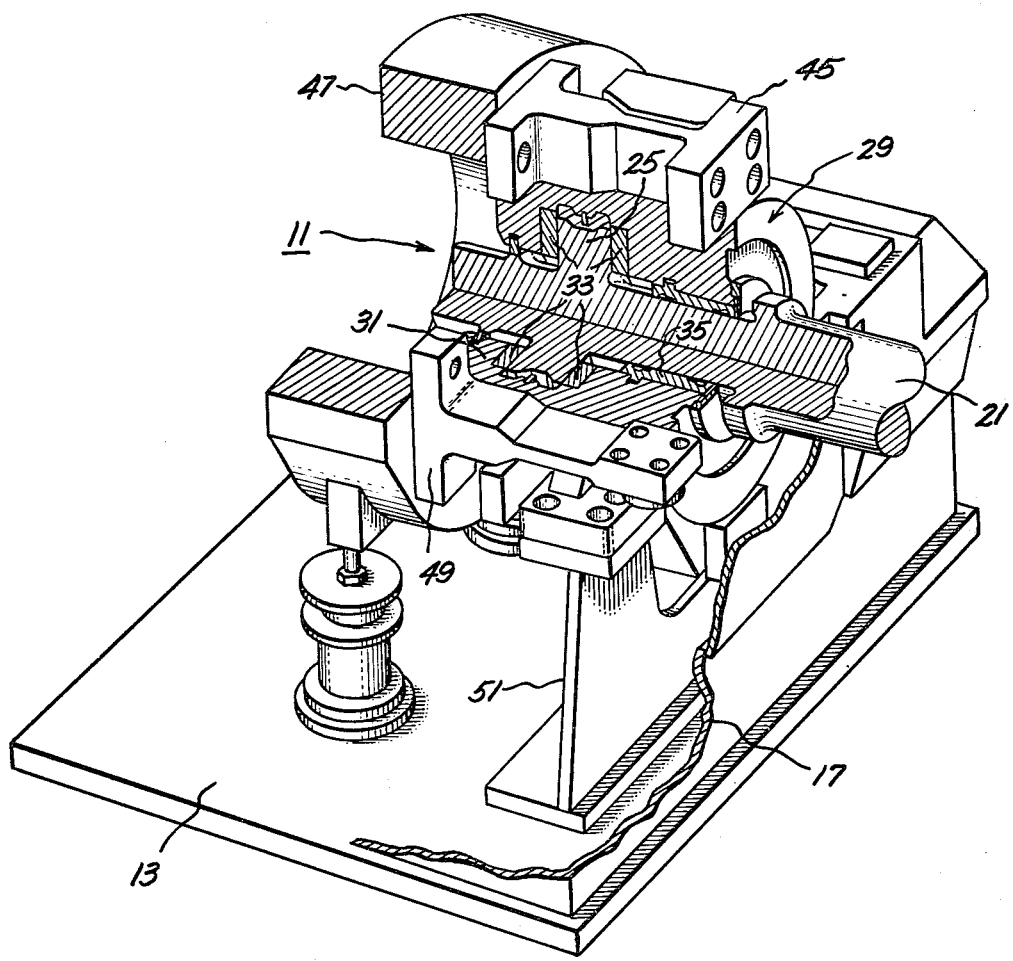
FIG. 1 is an isometric view partially sectioned and cut-away of a bearing standard, bearing support structure, a bearing casing and a portion of a turbine rotor.
Figure 2:
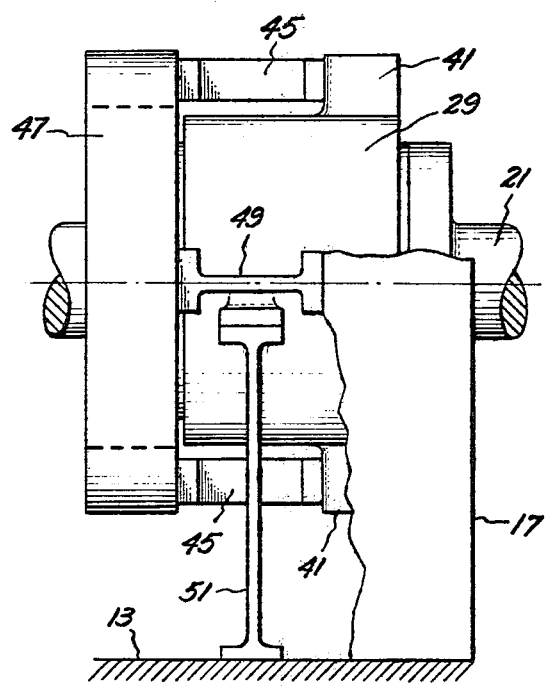
FIG. 2 is an elevation view of the bearing casing and support.

FIGS. 1 and 2 taken in combination show the construction of a bearing pedestal 11 in accordance with the present invention. A base plate or floor 13 supports the various bearing pedestal elements. The bearing is partially enclosed by a bearing standard 17, a portion of which is shown in FIG. 1. The bearing standard will provide support against thrust loadings transmitted by the bearing casing.

The bearing is used to support a rotor 21 a portion of which is shown in the drawing. The bearing functions to support the radial load of the rotor and axial thrust loads transmitted by the rotor in either direction. A thrust collar or runner 25 is formed on the rotor perpendicular to the axis of rotation for transmitting axial thrust loads in either direction to the bearing casing 29. The bearing casing surrounds the rotor and is split along a horizontal joint 31 for assembly purposes. The internal portion of the bearing casing includes stationary thrust bearing plates 33 for maintaining the axial position of the rotor in either direction. Further, the bearing casing includes a journal bearing 35. Thus the bearing casing shown is a combined journal and thrust bearing. While the present embodiment shows the thrust bearing surfaces straddling a single thrust runner and a journal bearing apart from that portion of the bearing, it is within the scope of the present invention to rearrange the bearing parts so as to include two thrust runners on the rotor at each end of the bearing casing which may have a journal bearing therebetween.

As is shown, perhaps more clearly in FIG. 2, the bearing casing 29 may be formed with a pair of projections 41. These projections provide attachment surfaces for one end of each of a pair of first axial flex struts 45. The "flexible" portions or areas of least cross-section of the flex struts may have a rectangular cross-section so that the bending stiffness is lower in the weak direction. The first pair of axial struts are also connected to a cross-member or yoke 47 which is positioned at one end of the bearing and which is not attached to the bearing casing except through the first pair of axial struts. At rest, the yoke or ring central axis coincides approximately with the bearing casing central axis. The yoke need not be annular or even have a central aperture. The aperture merely allows the rotor to pass through the yoke whereas functionally the yoke could be a solid plate.

A second pair of axial struts 49 are provided approximately 90° away from the first pair of axial struts relative to their location on the yoke 47. Each axial strut is fixed to the yoke at one end and to the bearing standard 17 at the other end. Hence, the second pair of axial struts 49 transfer bearing loads to the bearing standard. The struts 49 may also be rectangular in cross-section and are oriented to allow bearing flexure from the horizontal plane. Thus the first pair of axial struts 45 allows bending in the horizontal plane (sideways) whereas the second pair of flex struts 49 allows bending in the vertical plane (up and down).

The bearing casing is further supported by a transverse flex plate 51. The base of the flex plate is attached to the base plate 13. In the preferred embodiment of the invention the flexible portions of flex struts 45 and 49 are centered in the plane of the vertical transverse flex plate 51 so that the moment required to tilt the assembly is at a minimum. Stated in another way, the extended vertical plane of the flex plate cuts through the geometric center of the flexible portion of the axial struts. Thus, in the preferred embodiment, in order to locate the flexible portion of an axial strut (i.e., the dimension of reduced cross-section) extend the transverse plane to dissect the axial struts. In addition, the flex plate is located in a vertical plane which cuts approximately the mid-length of the journal bearing to minimize tilting due to radial loads.

Figure 3:
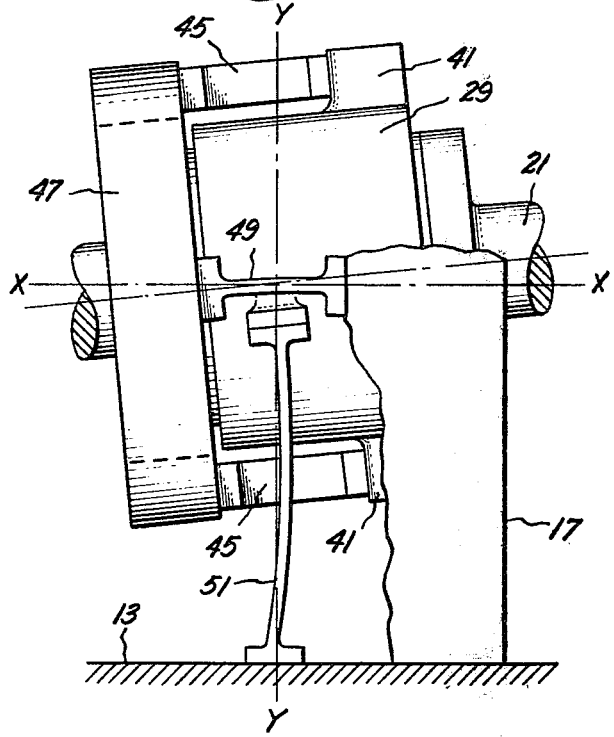
FIG. 3 is an elevation view of the bearing casing and bearing support showing rotor deflection from the horizontal plane.

FIG. 3 is similar to FIG. 2 but shows the bearing casing tilting with respect to the X—X or horizontal axis. Since the flexure occurs out of the horizontal plane, axial struts 45 in the vertical plane will remain stiff and straight whereas axial struts 49 (only one shown) will flex from the horizontal plane X—X. In this case, the yoke 47 follows the movement of the bearing casing 29 and flexure is taken up by the axial struts 49 and the vertical cross-wise flex plate 51. Vertical cross-wise flex plate 51 will bend from the vertical plane Y—Y as shown in FIG. 3.

Figure 4:
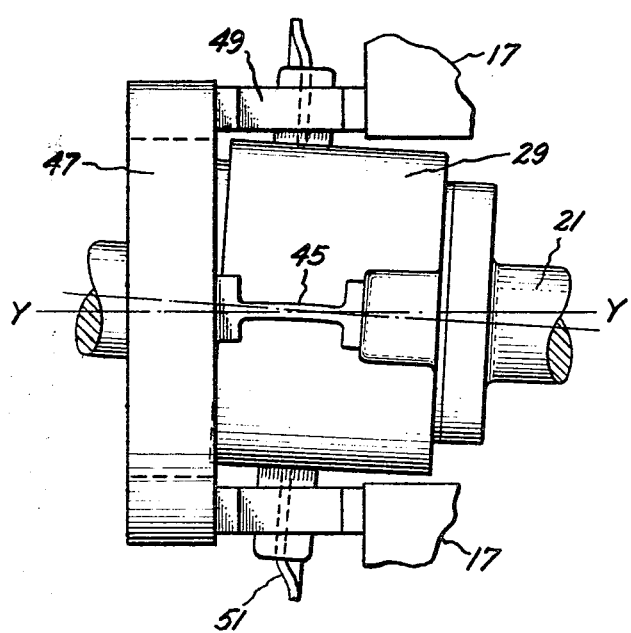
FIG. 4 is a plan view of the bearing casing and support means showing rotor deflection from the vertical plane.

FIG. 4 is a plan view of the bearing structure with Y—Y indicating a vertical plane. In the example shown, the rotor and bearing casing deflects from the vertical plane Y—Y due to rotor misalignment. Note that axial struts 45 in the vertical plane will deflect from the vertical plane by bending whereas the axial struts 49 attached to the bearing standard 17 remain stiff and straight. This causes the yoke 47 to remain fixed relative to the bearing standard. Flexure plate 51 will deflect by twisting as shown to accommodate bearing casing movement. It should be noted that in the preferred embodiment shown in FIGS. 3 and 4, the axial struts are approximately located so that their flexure midpoints occur in the plane of the vertical support plate.

While there has been shown what is considered to be the preferred embodiment of the invention, other modifications may occur to those skilled in the art. Such modifications may include a rearrangement of the position of the thrust and journal bearing surfaces including thrust surfaces at either end of the bearing casing and the journal in-between. Also, the yoke need not actually be an annular structure if the rotor does not have to pass through the yoke. The bearing structure is also suitable for vertical shaft machines.

What is claimed is:

1. A self-aligning bearing structure for supporting a rotor comprising:
    a bearing casing;
    a yoke positioned at one end of the bearing casing and substantially aligned with the rotor axis of rotation;
    a first pair of axially directed strut members connecting the bearing casing to the yoke; and,
    a second pair of axially directed strut members connecting the yoke to a support structure.

2. The bearing structure recited in claim 1 wherein each axially directed strut member has a rectangular cross section flexible portion, the cross section of the first pair of axially directed strut members being perpendicular to the cross section of the second pair of axially directed strut members.

3. The bearing structure recited in claim 2 wherein said first pair of axially directed strut members flex out of the vertical plane and the second pair of axially directed strut members flex out of the horizontal plane.

4. The bearing structure recited in claim 1 further comprising:
    a base floor plate; and,
    a transverse flex plate mounted on the base floor plate and connected to the bearing casing, said flex plate being substantially perpendicular to the axially directed strut members and supporting the bearing casing.

5. The bearing structure recited in claim 4 wherein each strut member has a reduced cross section flexible portion and the transverse flex plate is positioned approximately midway along the flexible portions of the strut members in the axial direction.

6. A bearing structure for supporting a rotor comprising:
    a bearing casing surrounding a portion of said rotor;
    a yoke positioned at one end of the bearing casing and substantially aligned with the rotor axis of rotation;
    a first pair of axially directed strut members having a reduced cross section flexible portion which are flexible out of the vertical plane of the rotor connecting the bearing casing to the yoke;
    a second pair of axially directed strut members having a reduced cross section flexible portion which are flexible out of the horizontal plane of the rotor connecting the yoke to a bearing standard mounted on a base floor plate; and,
    a transverse flex plate supported by the bearing base floor plate and connected to the bearing casing.

7. The bearing structure recited in claim 6 wherein the bearing casing includes a journal bearing portion and said flex plate lies in a plane approximately perpendicular to the bearing casing and mid-way between the ends of the journal bearing.

8. A bearing support structure for a large rotating shaft machine comprising:
   a bearing casing having an axial journal for accepting a rotor therethrough;
   a substantially annular yoke positioned at one end of the bearing casing and substantially aligned with the rotor axis of rotation;
   a bearing standard mounted on a base floor plate;
   a first pair of axially directed strut members connecting the bearing casing to the yoke;
   a second pair of axially directed strut members connecting the yoke to the bearing standard; and,
   a transverse flex plate mounted on the base floor plate and connected to the bearing casing supporting the bearing casing.

9. The bearing structure recited in claim 8 wherein each strut member has a reduced cross section flexible portion and the transverse flex plate lies in a vertical plane which intersects the midpoints of the flexible portions of the axially directed strut members.

* * * * *